United States Patent [19]

Kimura

[11] Patent Number: 4,475,796
[45] Date of Patent: Oct. 9, 1984

[54] EPIDARK ILLUMINATION SYSTEM

[75] Inventor: Tadashi Kimura, Tokyo, Japan

[73] Assignee: Olympus Optical Co., Ltd., Tokyo, Japan

[21] Appl. No.: 355,144

[22] Filed: Mar. 5, 1982

[30] Foreign Application Priority Data

Mar. 13, 1981 [JP] Japan ................................. 56-36144

[51] Int. Cl.³ ............................................ G02B 21/10
[52] U.S. Cl. .................................................. 350/525
[58] Field of Search ................................ 350/523–528

[56] References Cited

U.S. PATENT DOCUMENTS

| 2,097,762 | 11/1937 | Heine | 350/525 |
| 2,809,554 | 10/1957 | Bernhardt | 350/525 |
| 3,857,626 | 12/1974 | Rosenberger et al. | 350/525 |

FOREIGN PATENT DOCUMENTS

| 183975 | 12/1955 | Austria | 350/525 |
| 510756 | 10/1930 | Fed. Rep. of Germany | 350/525 |
| 34167 | 12/1964 | German Democratic Rep. | 350/525 |

OTHER PUBLICATIONS

Makosch et al., "Dark-Field Illuminator", IBM Tech. Disc. Bull., 6-1978, p. 226.

Primary Examiner—William H. Punter
Attorney, Agent, or Firm—Cushman, Darby & Cushman

[57] ABSTRACT

An Epidark illumination system wherein an optical member for forming the image of a light source is provided in a dark field light path to illuminate a sample with the light from the image of the light source in order to be able to make a uniform bright illumination with a simple formation. The optical member can be any of a ring-shaped convex lens or concave lens, a ring-shaped multi-element lens made by arranging a plurality of convex lenses or concave lenses in the same plane, a compound cylindrical lens made by concentrically circularly arranging cylindrical lenses, a radial lens and a multi-element lens made by arranging a plurality of concentric ring-shaped lenses so that the surfaces of the lenses may be higher in turn outward from the center. Further, a light collecting lens or a light collecting mirror may be arranged in the dark field light path.

20 Claims, 19 Drawing Figures

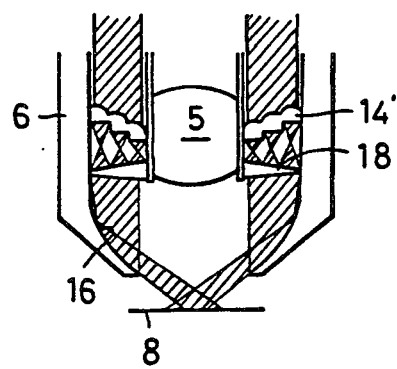
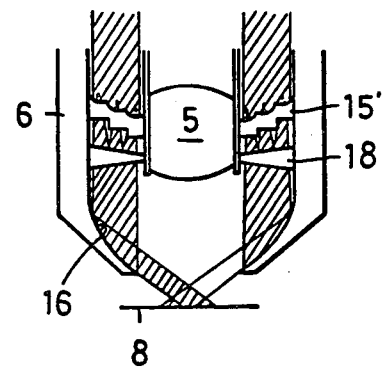
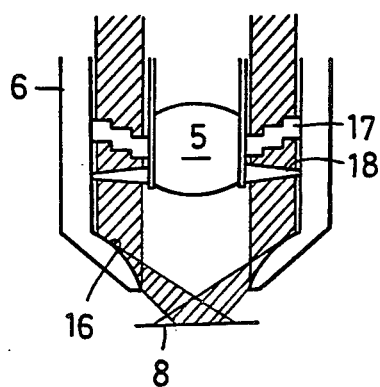
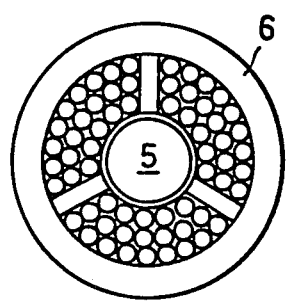
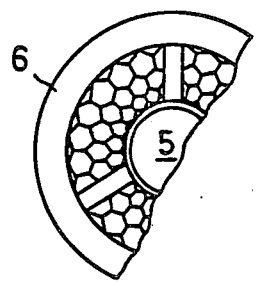
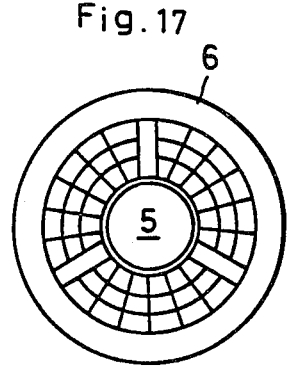

EPIDARK ILLUMINATION SYSTEM

BACKGROUND OF THE INVENTION (a) Field of the Invention

This invention relates to an epidark illumination system wherein the light from a light source is made to pass through a space formed between a sleeve and an objective lens to illuminate a sample.

(b) Description of the Prior Art

Generally, an epidark illumination system is of such formation as is shown in FIG. 1 wherein the light from a light source 1 will be passed through a stop 2 having a ring-shaped aperture and located in front of the light source, will be once made a parallel light pencil by a condenser lens 3, will then be reflected by a ring-shaped mirror 4 coaxial with the optical axis of an observing optical system and arranged obliquely, will then be passed through a cylindrical space formed by an objective lens 5 and a sleeve 6 provided around it and will be reflected by a ring-shaped conical mirror 7 provided in front of and coaxially with the objective lens 5 to illuminate a sample 8. In such epidark illumination system, the illuminating light pencil is formed cylindrically, the light pencil is cut by bridges for holding the objective lens 5 within the sleeve 6, the incident angle of the illumination light must be so selected that the light directly reflected from the sample 8 does not enter the objective lens 5 and therefore it is difficult to make such uniform illumination as the Kohler illumination utilized in a transmitted illumination system. Therefore, various attempts have been made to eliminate the uneven light amount (ununiform illumination) of the illuminating system. As one of them, a frosted glass-like optical member is placed within the cylindrical space between the sleeve and objective lens to thereby diffuse the illuminating light pencil and to reduce the ununiform illumination. Further, even in an objective lens of a high magnification, in order to lead the light diffused by a diffusing member onto the sample lest the directly reflected light from the sample surface should enter the objective lens, a light collecting lens is provided near the front end of the objective lens or the reflecting mirror is made to have a curvature. However, in such method as in the above, the loss of the light amount is large due to the diffusion of the light by the diffusing member. If such loss of the light amount is to be reduced, the unevenness of illumination will not be able to be well corrected.

SUMMARY OF THE INVENTION

A primary object of the present invention is to provide an epidark illumination system wherein the formation is simple and a uniform bright illumination can be made.

According to the present invention, this object is attained by providing an image forming member coaxial with an objective lens within a sleeve to form a light source image within the sleeve.

According to a preferred formation of the present invention, the image forming member is any of a ring-shaped convex lens or concave lens, a ring-shaped multi-element lens made by arranging a plurality of convex lenses or concave lenses in the same plane, a compound cylindrical lens (or Fresnel lens) made by concentrically circularly arranging cylindrical lenses, a radial lens and a multi-element lens made by concentrically arranging a plurality of ring-shaped lenses so that the surfaces of the respective lenses may be higher in turn outward from the optical axis of the objective lens. Further, a light collecting lens or a light collecting mirror may be arranged within the sleeve.

In the epidark illumination system of the present invention, after the light source image is once formed, the sample will be illuminated and therefore the light amount will not be uneven. Further, as no diffusing member is used, the illuminating light pencil will not be scattered. Therefore, the light amount will not be short and a bright illumination will be obtained. Further, as the light source image is formed, even if the proper illuminating condition is different depending on the kinds (magnification, NA and the like) of the objective lens, a proper illumination will be easily obtained by changing and properly selecting the position of forming the image of the light source. Further, the image forming member can be cheaply and easily made of a plastic molding. The diffusing member except the connecting member and the light collecting lens near the front end of the objective lens are not required. The mirror in the front end part of the objective lens is not required to have a curvature and therefore a bright illumination system can be cheaply obtained.

BRIEF DESCRIPTION OF THE DRAWINGS

FIGS. 4 to 17 are views showing other embodiments of image forming members used in the epidark illumination system according to the present invention.

DESCRIPTION OF THE PREFERRED EMBODIMENTS

Figure 1:
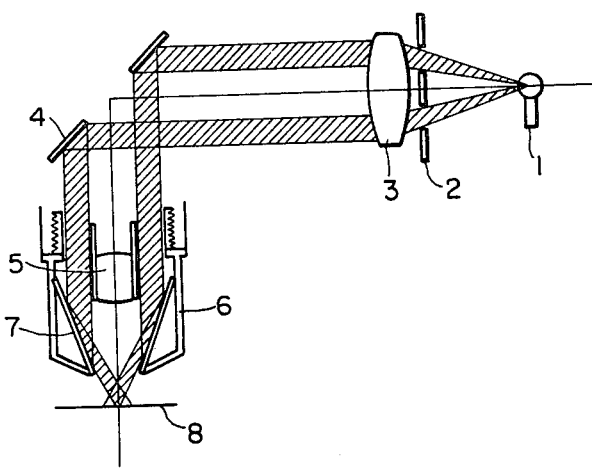
FIG. 1 is a view showing the formation of a conventional epidark illumination system.
Figure 2:
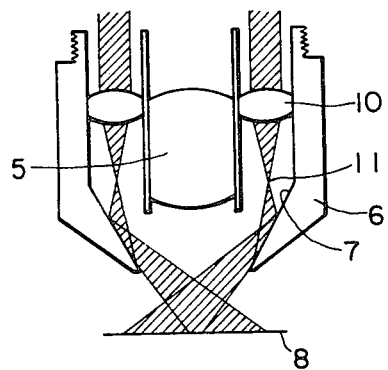
FIGS. 2 and 3 are views showing the formations respectively of a first embodiment and second embodiment of an epidark illumination system according to the present invention.

The detailed contents of the present invention shall be explained in the following on the basis of the respective embodiments. FIG. 2 is a view showing the first embodiment of the present invention in which a ring-shaped convex lens is used as an image forming member. In this embodiment, the light from a light source will be converged by a ring-shaped convex lens 10 and a light source image will be formed to be ring-shaped in a position indicated by the reference numeral 11. The arranging position and focal length of the ring-shaped convex lens 10 are so set that this light source image will be formed within a sleeve 6. The thus formed light source image 11 will act as a secondary light source on a sample 8 as if a ring-shaped light source were in this light source image position and the sample 8 will be illuminated by the illuminating light from this secondary light source. That is to say, the light pencil having once formed the image will be again diverged and will be reflected by a reflecting surface 7 to illuminate a zone having the optical axis of an objective lens 5 as a center of the sample 8. Thus, in the embodiment shown in FIG. 2, as the light pencil of a comparatively large NA from the secondary light source can be utilized as an illuminating light, the sample can be illuminated with an NA large enough to satisfy the NA of the objective lens 5. Further, as the illuminating light pencil is a diverging light pencil, the central zone of the ring-shaped illumination will not become dark and the illumination will not be uneven.

Figure 3:
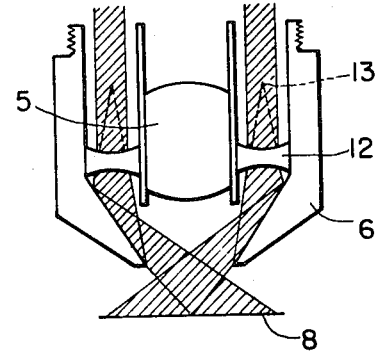

FIG. 3 is of the second embodiment is which a ring-shaped concave lens 12 is provided instead of the ring-shaped convex lens 10 in the first embodiment in FIG. 2. In the second embodiment, the light source image will be formed as a virtual image 13 in a position separated from the sample 8 more than the ring-shaped convex lens 12. Therefore, if the focal length and arranging position of the ring-shaped concave lens 12 are so determined that this virtual image 13 will be formed in a position proper for the secondary light source, the same operation and effect as of the first embodiment shown in FIG. 2 will be obtained.

Figure 4:
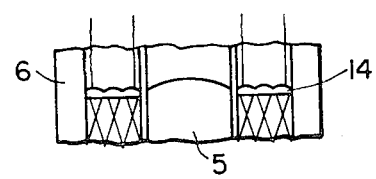

FIG. 4 is of the third embodiment in which only the part in which the image forming member is arranged is shown. In this embodiment, a ring-shaped multi-element lens 14 made by arranging a plurality of convex lenses in the same plane is arranged. The image position by each lens element of the multi-element lens 14 corresponds to the secondary light source 11 of the first embodiment shown in FIG. 2.

Figure 5:
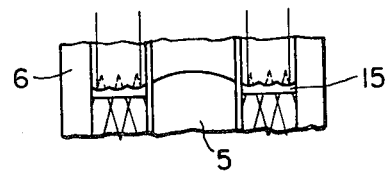

FIG. 5 shows a fourth embodiment in which a ring-shaped multi-element lens 15 of which each lens element is a concave lens is arranged.

In case the multi-element lens 14 or 15 is used for the image forming member as described above, the parallel light pencil coming to enter the cylindrical space within the sleeve 6 will be converged by the individual elements of the multi-element lens and many small light source images will be formed as parallelly arranged within the cylindrical space. Therefore, the secondary light source will consist of many parallelly arranged light sources and will be close to a surface light source and the ununiform illumination will further reduce. Further, the multi-element lens is different from such diffusing member as a frosted glass and will not diffuse the light pencil in every direction. Therefore, the illuminating light will not be diffused and wasted and the illuminating light amount will not be likely to be short.

Figure 6:
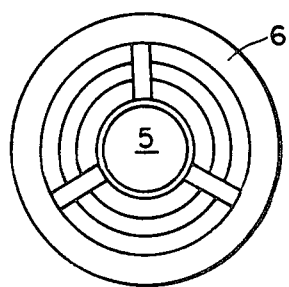
Figure 7:
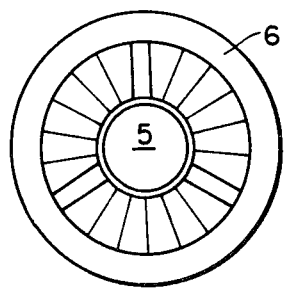
Figure 8:
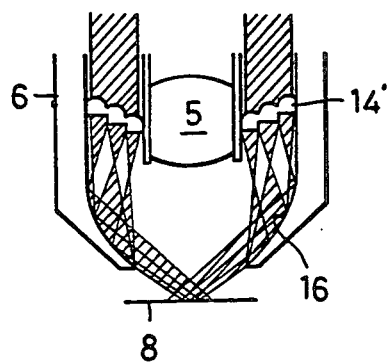

FIGS. 6 and 7 are plan views of other embodiments of the image forming member used in the present invention. Shown in FIG. 6 is a compound cylindrical lens (or Fresnel lens) made by circular lenses concentrically arranged. Shown in FIG. 7 is a radial-shaped lens.

Figure 9:
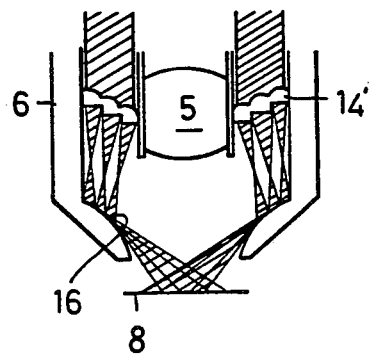
Figure 10:
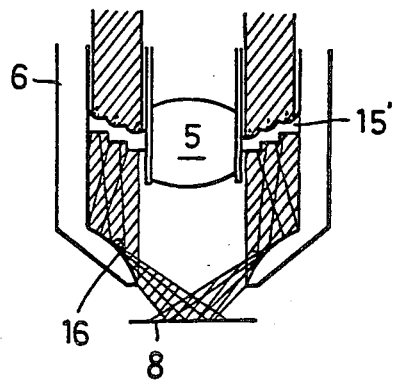
Figure 11:
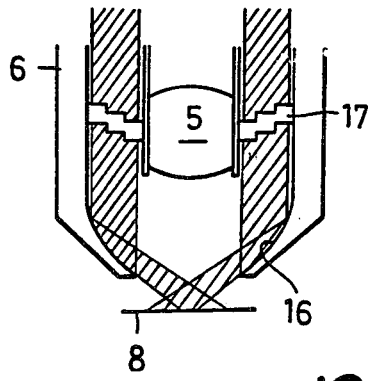

FIGS. 8 to 14 respectively show still other embodiments different from each other in which the image forming member is made by arranging a plurality of lenses as deviated instead of being in the same plane. That is to say, in the embodiment of FIG. 8, a ring-shaped multi-element lens 14' made by arranging a plurality of convex lenses in different planes with each other is used as the image forming member. Besides, in this embodiment, a reflecting surface 16 provided on the inside of the lower portion of the sleeve 6 is formed as a converging curved surface to further increase the effect by the image forming member. The embodiment of FIG. 9 is different from that of FIG. 8 in respect that the reflecting surface 16 is formed as a diverging curved surface. The embodiment of FIG. 10 is different from that of FIG. 9 in respect that a ring-shaped multi-element lens 15' made by arranging a plurality of concave lenses in different planes with each other is used as the image forming member. The embodiment of FIG. 11 is different from that of FIG. 8 in respect that a compound cylindrical lens 17 made by concentrically circularly arranging a plurality of cylindrical lenses in different planes with each other is used instead of the ring-shaped multi-element lens 14'. Further, the embodiments of FIGS. 12, 13 and 14 are respectively different from those of FIGS. 8, 10 and 11 in respect that a ring-shaped light collecting lens 18 is added in front of the image forming member to effectively collect light pencils passed through the image forming member on the sample 8. In FIG. 13, the reflecting surface 16 is formed as a converting curved surface and in FIG. 14, the reflecting surface 16 is formed as a diverging curved surface. FIGS. 15 and 16 show plan views different from each other of the embodiments shown in FIGS. 8, 9, 10, 12 and 16. Further, FIG. 17 shows a plan view different from FIG. 6 in configuration of the embodiments shown in FIGS. 11 and 14.

Also in the case of using such image forming members as in the above, light source images will be formed by them, the light will be projected on the sample surface by using any of the images as a secondary light source and a uniform illumination will be made.

Figure 18A:
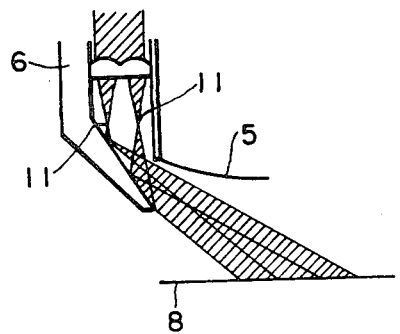
FIGS. 18A and 18B are views showing proper secondary light source image positions by the epidark illumination system of the present invention in the case that the objective lenses are different from each other.
Figure 18B:
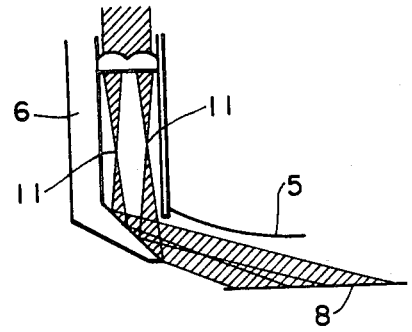

In the epidark illumination system of the present invention shown in each of the above embodiments, it is preferable to select the position of forming the light source image to be in a proper position depending on the magnification and NA of the objective lens 5. That is to say, it is preferable that, for the objective lens 5 of a low magnification or small NA, the light source image 11 is formed in a position far from the sample 8 as shown in FIG. 18A and, for the objective lens 5 of a high magnification or large NA, the light source image 11 is formed near to the sample 8 as shown in FIG. 18B.

I claim:

1. An epidark illumination system comprising an objective lens, a sleeve supporting therein said objective lens so as to be able to lead the light from a light source onto a sample through a space formed between said sleeve and objective lens, and an image forming member arranged in said space to form the image of said light source within said sleeve, wherein said image forming member is a ring-shaped multi-element lens made by arranging a plurality of convex lenses in different planes with each other.

2. An epidark illumination system comprising an objective lens, a sleeve supporting therein said objective lens so as to be able to lead the light from a light source onto a sample through a space formed between said sleeve and objective lens, wherein said sleeve has a reflecting surface, and an image forming member arranged in said space to form the image of said light source within said sleeve, wherein said image forming member is a ring-shaped multi-element lens made by arranging a plurality of convex lenses in different planes with each other.

3. An epidark illumination system according to claim 2 wherein said reflecting surface is a converging curved surface.

4. An epidark illumination system according to claim 2 wherein said reflecting surface is a diverging curved surface.

5. An epidark illumination system according to claim 2 further comprising a ring-shaped light collecting lens to collect light pencils passed by said ring-shaped multi-element lens.

6. An epidark illuminating system comprising an objective lens, a sleeve supporting therein said objective lens so as to be able to lead the light from a light source onto a sample through a space formed between said sleeve and objective lens, and an image forming member arranged in said space to form the image of said light source within said sleeve, wherein said image forming member is a ring-shaped multi-element lens made by arranging a plurality of concave lenses in different planes with each other.

7. An epidark illumination system comprising an objective lens, a sleeve supporting therein said objective lens so as to be able to lead the light from a light source onto a sample through a space formed between said sleeve and objective lens, wherein said sleeve has a reflecting surface, and an image forming member arranged in said space to form the image of said light source within said sleeve, wherein said image forming member is a ring-shaped multi-element lens made by arranging a plurality of concave lenses in different planes with each other.

8. An epidark illumination system according to claim 7 wherein said reflecting surface is a converging curved surface.

9. An epidark illumination system according to claim 7 wherein said reflecting surface is a diverging curved surface.

10. An epidark illumination system according to claim 7 further comprising a ring-shaped light collecting lens to collect light pencils passed by said ring-shaped multi-element lens.

11. An epidark illumination system comprising an objective lens, a sleeve supporting therein said objective lens so as to be able to lead the light from a light source onto a sample through a space formed between said sleeve and objective lens, and an image forming member arranged in said space to form the image of said light source within said sleeve, wherein said image forming member is a compound cylindrical lens made by concentrically circularly arranging a plurality of cylindrical lenses in different planes with each other.

12. An epidark illumination system comprising an objective lens, a sleeve supporting therein said objective lens so as to be able to lead the light from a light source onto a sample through a space formed between said sleeve and objective lens, wherein said sleeve has a reflecting surface, and an image forming member arranged in said space to form the image of said light source within said sleeve, wherein said image forming member is a compound cylindrical lens made by concentrically circularly arranging a plurality of cylindrical lenses in different planes with each other.

13. An epidark illumination system according to claim 12 wherein said reflecting surface is a converging curved surface.

14. An epidark illumination system according to claim 12 wherein said reflecting surface is a diverging curved surface.

15. An epidark illumination system according to claim 12 further comprising a ring-shaped light collecting lens to collect light pencils passed by said compound cylindrical lens.

16. An epidark illumination system comprising an objective lens, a sleeve supporting therein said objective lens so as to be able to lead the light from a light source onto a sample through a space formed between said sleeve and objective lens, and an image forming member arranged in said space to form the image of said light source within said sleeve, wherein said image forming member is a radial lens made by radially arranging a plurality of lens elements in different planes with each other.

17. An epidark illumination system comprising an objective lens, a sleeve supporting therein said objective lens so as to be able to lead the light from a light source onto a sample through a space formed between said sleeve and objective lens, wherein said sleeve has a reflecting surface, and an image forming member arranged in said space to form the image of said light source within said sleeve, wherein said image forming member is a radial lens made by radially arranging a plurality of lens elements in different planes with each other.

18. An epidark ollumination system according to claim 17 wherein said reflecting surface is a converging curved surface.

19. An epidark illumination system according to claim 17 wherein said reflecting surface is a diverging curved surface.

20. An epidark illumination system according to claim 17 further comprising a ring-shaped light collecting lens to collect light pencils passed by said radial lens.

* * * * *